(12) United States Patent
Parker et al.

(10) Patent No.: US 9,228,093 B2
(45) Date of Patent: Jan. 5, 2016

(54) COLORED WATER-REPELLANT AND CROCKING-RESISTANT COMPOSITIONS

(71) Applicant: WEYERHAEUSER NR COMPANY, Federal Way, WA (US)

(72) Inventors: Erik M. Parker, Bonney Lake, WA (US); Jack G. Winterowd, Puyallup, WA (US); Glen Robak, Meridian, ID (US)

(73) Assignee: Weyerhaeuser NR Company, Federal Way, WA (US)

( * ) Notice: Subject to any disclaimer, the term of this patent is extended or adjusted under 35 U.S.C. 154(b) by 183 days.

(21) Appl. No.: 14/057,771

(22) Filed: Oct. 18, 2013

(65) Prior Publication Data

US 2015/0111008 A1    Apr. 23, 2015

(51) Int. Cl.
| | |
|---|---|
| *C09D 7/12* | (2006.01) |
| *C09D 5/02* | (2006.01) |
| *C09D 15/00* | (2006.01) |
| *C09D 109/08* | (2006.01) |
| *C09D 133/00* | (2006.01) |
| *C08K 5/524* | (2006.01) |

(52) U.S. Cl.
CPC .............. *C09D 7/1233* (2013.01); *C09D 5/024* (2013.01); *C09D 15/00* (2013.01); *C09D 109/08* (2013.01); *C09D 133/00* (2013.01); *C08K 5/524* (2013.01); *Y10T 428/24777* (2015.01); *Y10T 428/277* (2015.01)

(58) Field of Classification Search
CPC ....................................................... C08K 5/524
See application file for complete search history.

(56) References Cited

U.S. PATENT DOCUMENTS

| | | |
|---|---|---|
| 3,248,246 A | 4/1966 | Sears |
| 3,639,298 A | 2/1972 | Lister |
| 3,792,007 A | 2/1974 | Gleason |
| 3,920,459 A | 11/1975 | Allen |
| 3,997,493 A | 12/1976 | Morgan |
| 4,443,520 A | 4/1984 | Braithwaite, Jr. |
| 4,533,689 A | 8/1985 | Tayama |
| 4,722,945 A | 2/1988 | Wood |
| 4,764,539 A | 8/1988 | Ladang |
| 4,788,008 A | 11/1988 | Neubert |
| 4,806,162 A | 2/1989 | Ladang |
| 5,158,606 A | 10/1992 | Carlick et al. |
| 5,232,976 A | 8/1993 | Horacek |
| 5,290,857 A | 3/1994 | Ashida |
| 5,635,566 A | 6/1997 | Gerharz |
| 5,637,633 A | 6/1997 | Adams |
| 5,733,958 A | 3/1998 | Adams |

(Continued)

FOREIGN PATENT DOCUMENTS

| | | |
|---|---|---|
| EP | 0 245 779 A1 | 11/1987 |
| EP | 0 338 347 B1 | 2/1992 |

(Continued)

*Primary Examiner* — Bruce H Hess
*Assistant Examiner* — Christopher Polley
(74) *Attorney, Agent, or Firm* — Weyerhaeuser Law Dept; Timothy M. Whalen

(57) ABSTRACT

The present disclosure provides colored compositions formulated to provide water repellency and crocking resistance when applied as a coating to a surface (e.g., the surface of a wood product). The compositions include a colored pigment, a wax emulsion, a latex polymer, and a halogenated phosphate ester. Wood products treated with the composition, as well as methods for applying the composition to a surface, are also provided.

19 Claims, 3 Drawing Sheets

(56) References Cited

U.S. PATENT DOCUMENTS

| | | | |
|---|---|---|---|
| 5,952,248 A | 9/1999 | Horton | |
| 5,968,669 A | 10/1999 | Liu | |
| 5,998,543 A | 12/1999 | Collins | |
| 6,084,008 A | 7/2000 | Liu | |
| 6,128,874 A | 10/2000 | Olson | |
| 6,207,085 B1 | 3/2001 | Ackerman | |
| 6,383,652 B1 | 5/2002 | Templeton | |
| 6,747,074 B1 | 6/2004 | Buckingham | |
| 7,045,079 B2 | 5/2006 | Erismann | |
| 7,928,160 B2 | 4/2011 | Senkfor | |
| 8,129,492 B1 | 3/2012 | Barancyk | |
| 8,461,253 B2 | 6/2013 | Ambrose | |
| 2003/0004247 A1 | 1/2003 | Destandau | |
| 2004/0002559 A1 | 1/2004 | Troutman | |
| 2004/0261191 A1 | 12/2004 | Yang | |
| 2005/0009966 A1 | 1/2005 | Rowen | |
| 2006/0079612 A1 | 4/2006 | Troutman | |
| 2006/0258548 A1* | 11/2006 | Gouko | B29C 33/60 508/421 |
| 2007/0167545 A1 | 7/2007 | Sugerman | |
| 2008/0166484 A1 | 7/2008 | Smith | |
| 2010/0190886 A1 | 7/2010 | Schmitt | |
| 2010/0304126 A1* | 12/2010 | Wu | B27N 7/00 428/326 |
| 2011/0136937 A1 | 6/2011 | Wierzbicki | |
| 2011/0256320 A1 | 10/2011 | Gebregiorgis | |
| 2012/0107547 A1 | 5/2012 | Fernando | |
| 2012/0145721 A1* | 6/2012 | Cavallin | C08F 283/006 220/626 |
| 2012/0164462 A1 | 6/2012 | Schmitt | |
| 2012/0216722 A1* | 8/2012 | Stuart | C04B 28/14 106/778 |
| 2012/0263961 A1 | 10/2012 | Beaudry | |
| 2013/0079456 A1* | 3/2013 | Yang | C08F 220/14 524/506 |
| 2015/0132508 A1* | 5/2015 | Zhou | B41M 5/508 428/32.16 |

FOREIGN PATENT DOCUMENTS

| | | |
|---|---|---|
| WO | 2008038869 A1 | 4/2008 |
| WO | 2009013089 A1 | 1/2009 |
| WO | 2009086507 A2 | 7/2009 |
| WO | 2010078355 A2 | 7/2010 |
| WO | 2011088006 A1 | 7/2011 |
| WO | 2012074617 A2 | 6/2012 |

* cited by examiner

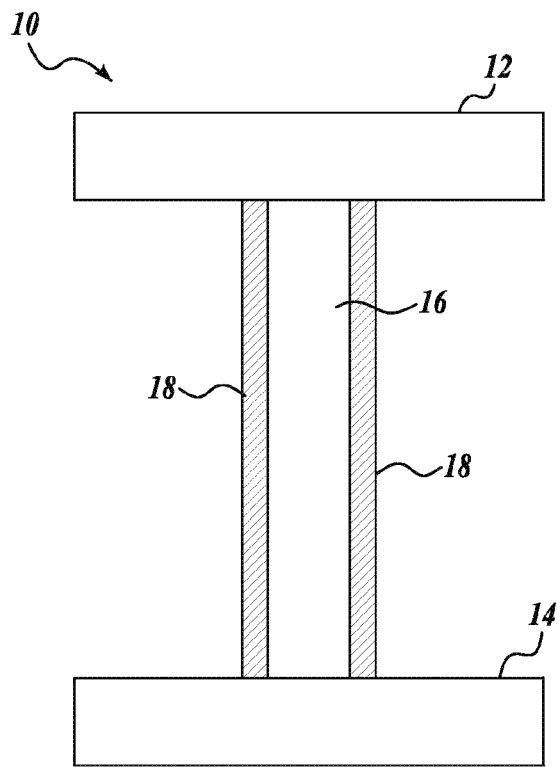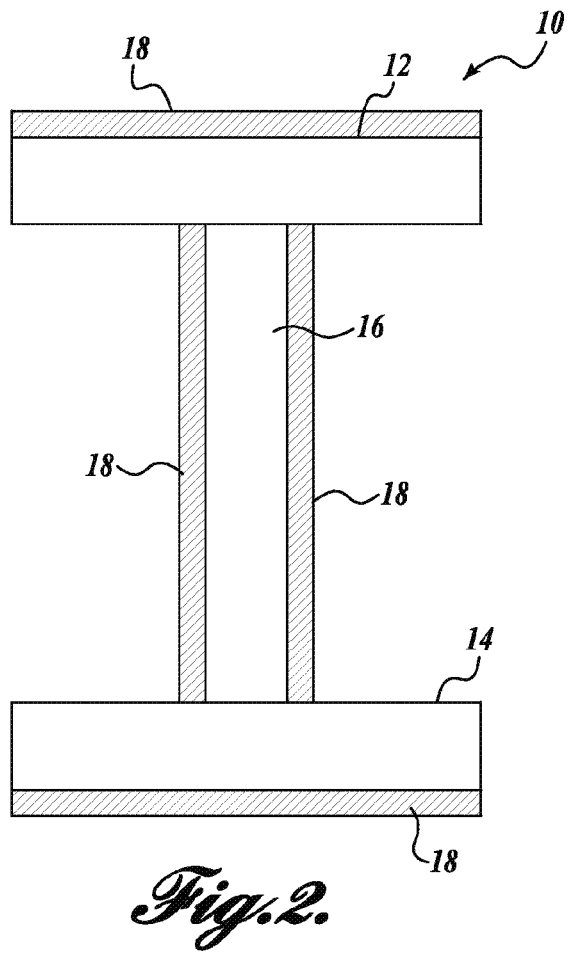

COLORED WATER-REPELLANT AND CROCKING-RESISTANT COMPOSITIONS

BACKGROUND

Water repellants ("sealants") are commonly applied to surfaces of manufactured structural wood products in order to provide visual differentiation and to retard water absorption in the event of exposure to precipitation. Wood products treated with sealants on at least one surface include solid-sawn lumber and composites such as oriented strandboard (OSB), laminated veneer lumber (LVL), and others. In North America the sealants are typically applied to the wooden substrates on finishing lines at the primary manufacturing plant. Most sealants are water-based in order to comply with environmental and safety regulations and are made by combining a wax emulsion, a polymer latex and one or more colored pigment dispersions.

Many colored sealants for manufactured structural wood products exhibit "crocking," which is the tendency for colored material from the sealant to be transferred to a second surface that is being rubbed against the previously applied sealant. Unfortunately, manufactured structural wood products are routinely handled and contacted during the process of packaging, transporting and use of the products during construction. Sealants that exhibit significant crocking present problems, which include unwanted transfer of colored material from the sealant to hands, gloves, boots, shirts, pants, equipment, and other objects that might contact the applied sealant on the surface of the wood product. In many cases the transferred colored material is unsightly and can be difficult to remove.

The tendency for a sealant to exhibit crocking can be easily evaluated by rubbing a white paper towel across a layer of dried sealant. If colored material transfers from the sealant to the paper towel, then the sealant is considered to exhibit crocking. Crocking is somewhat analogous to marking a paper with a crayon, which is generally comprised of colored pigment and wax. Some sealants have greater crocking potential than others. Sealants with greater crocking potential would be associated with greater color transfer in a standard rubbing procedure. Sealants that exhibit some level of crocking include CBS 197H (green), which is manufactured by the Willamette Valley Company (Eugene, Oreg., USA), and WE1460, which is manufactured by Walker Industries (Burlington, ON, CAN). In fact, essentially all colored sealants (comprised of wax emulsion, polymer latex and colored pigments) exhibit some level of crocking.

Upon application of an aqueous sealant to a wood product substrate, the water in the formulation either evaporates or absorbs into the substrate. The residual portion of the formula generally exists as a film of pigment particles dispersed in a soft, elastic matrix of wax (major component) and polymer (minor component). A relatively high wax level is required in order to impart water-repellency to the sealant. Unfortunately, the wax component is relatively soft and is particularly prone to transfer to another object via a rubbing action. The polymer component is relatively expensive and is usually less hydrophobic than the wax, but it imparts elasticity and toughness to the film and also improves wet adhesion to the wood. Higher levels of elastic polymer tend to reduce the crocking potential of the sealant, but this modification results in increased cost and reduced water repellency.

Thus, there is a need to improve the crocking potential of aqueous, colored, sealants for use in wood products without significantly increasing costs or reducing water-repellency.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a colored, water-repellant, sealant composition having crocking resistance is provided. In one embodiment, the composition includes: a polymer latex; a halogenated phosphate ester; a wax emulsion; and a colored pigment.

Other aspects include wood products treated with the composition, as well as methods for applying the composition to a surface

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1 and 2 are side cross-sectional views of I-joists coated with a composition according to embodiments of the disclosure;

DETAILED DESCRIPTION

Figure 3:
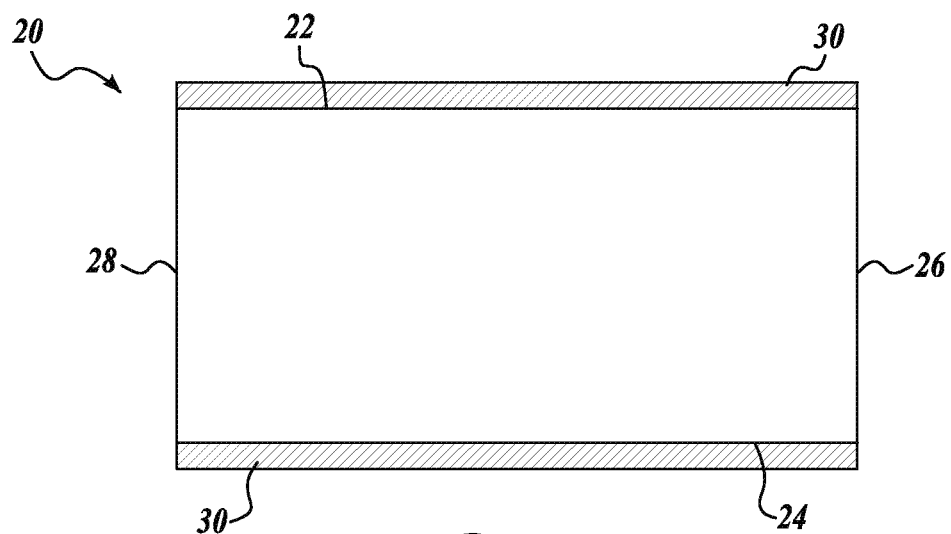
FIGS. 3 and 4 are side cross-sectional views of wood products coated with a composition according to embodiments of the disclosure.

The present disclosure describes compositions formulated to provide a colored, water-repellant, and crocking-resistant coating to a surface (e.g., the surface of a wood product).

In one aspect, a colored, water-repellant, sealant composition having crocking resistance is provided. In one embodiment, the composition includes:
a polymer latex;
a halogenated phosphate ester;
a wax emulsion; and
a colored pigment.

Certain specific details are set forth in the following description and FIGURES to provide a thorough understanding of various embodiments of the disclosure. Well-known structures, systems, and methods often associated with such systems have not been shown or described in detail to avoid unnecessarily obscuring the description of various embodiments of the disclosure. In addition, those of ordinary skill in the relevant art will understand that additional embodiments of the disclosure may be practiced without several of the details described below. Certain terminology used in the disclosure is defined as follows:

"Wood product" is used to refer to a product manufactured from logs, such as lumber (e.g., boards, dimension lumber, solid sawn lumber, joists, headers, beams, timbers, moldings, laminated, finger jointed, or semi-finished lumber), composite wood products, or components of any of the aforementioned examples.

"Composite wood product" is used to refer to a range of derivative wood products which are manufactured by binding together the strands, particles, fibers, or veneers of wood, together with adhesives, to form composite materials. Examples of composite wood products include but are not limited to glulam, plywood, parallel strand lumber (PSL), oriented strand board (OSB), oriented strand lumber (OSL), laminated veneer lumber (LVL), laminated strand lumber (LSL), particleboard, medium density fiberboard (MDF), cross-laminated timber, and hardboard.

When applied as a coating, the provided compositions provide water repellency. As used herein, the term "water repellency" refers to the ability of the coating to retard the water absorption process through the treated surface.

When applied as a coating, the provided compositions provide crocking resistance. As used herein, the term "crocking resistance" refers to the ability of the coating to resist transfer of colored material to a second object that is being rubbed against the coating.

The term "solids basis" refers to the amount of each component, after removal of water, as a percentage of the total formula. The "solids content" or "solids basis" (expressed as a percentage) of a given component in an applied, dry coating composition can be calculated according to the following equation:

$$\text{Solids Content of Component '}X\text{'} = (A)(B)/(C)$$

Where:

A=non-volatile content (or solids content) of component 'X', expressed as a percentage;

B=relative amount of component 'X' in the wet formulation (prior to application to a substrate), expressed as a percentage; and C=non-volatile (or solids content) of the total wet formulation (prior to application to a substrate), expressed as a percentage.

The above equation is useful for determining the relative level of a particular component in an applied, dry coating based on the level of that same component in a wet coating composition.

For example, if the wax emulsion had a non-volatile content of 58%, and it was present in the total sealant formula at a level of 50% on a wet basis, and the total sealant formula had a non-volatile content of 40%, then the wax emulsion component would constitute about 72.5% (72.5%=(58%)(50%)/40%) of the sealant formula on a solids basis.

The term "about" is used herein to modify a related value by +/−5%.

When used as sealants, the compositions are generally used in order to slow down the rate of water absorption into a wood product. This is beneficial because the water absorption results in dimensional distortion and biodegradation of the wood product. The sealants are often colored in order to provide visual differentiation and brand recognition in the marketplace, which is a secondary benefit of the coating (reduced water absorption rate being the primary benefit). The issue of crocking is a problem, but the industry accepts it, because the benefits of the sealant are sufficiently compelling. The dramatic and unexpected reduction in crocking exhibited by the disclosed compositions provides significant benefit over existing colored sealants.

The components of the provided compositions will now be described.

Polymer Latex

The polymer latex is incorporated into the composition in order to 1) increase the strength and durability of the coating that forms as the applied composition dries on a wood substrate; and 2) increase the wet strength of the bond that exists between the coating and the wood substrate.

Polymer latex suitable for this invention includes acrylic latex products and styrene-butadiene latex products. These latex products are generally made by emulsifying monomers in a continuous aqueous medium and subsequently polymerizing the monomers to form a stable dispersion of polymer particles. Monomers suitable for use in the preparation of these polymer latex products include butadiene, styrene, acrylic acid, acrylonitrile, acrylic acid, methyl methacrylate, methyl acrylate, ethyl acrylate, 2-ethylhexyl acrylate, butyl acrylate, butyl methacrylate, and others. Typically, the polymer latex has a pH value greater than 7, a percent solids of about 38-55%, and glass transition temperature (for the polymer) of about 40 to 35° C. An example of a suitable polymer latex is RayTech 51, an acrylic latex that is manufactured by Specialty Polymers (Woodburn, Oreg.).

In one embodiment, the polymer latex is present from about 2% to 30% on a solids basis. In one embodiment, the polymer latex is present from about 4% to 25% on a solids basis. In one embodiment, the polymer latex is present from about 8% to 20% on a solids basis.

The polymer latex in this invention is modified with a halogenated phosphate ester. This is accomplished by mixing the polymer latex with a halogenated phosphate ester at a mix ratio of about 20:1 to 1:1 parts by mass on a solids basis, respectively. In one embodiment the two components can be combined with no other components present. In this embodiment, the mixture is then introduced into the total formula after a storage time.

In another embodiment, the two components can be combined in the presence of the wax emulsion and other components so that the formula can be prepared in a single mix tank. There are processing advantages associated with the later approach. In the second embodiment it is only critical to ensure that the halogenated phosphate ester is combined with the polymer latex in a manner that ensures that a single phase exists in the mixture. The halogenated phosphate ester is essentially not miscible or soluble in water, but it can be incorporated into certain water-based emulsions, including the wax emulsions and polymer latex products that are typically used to prepare sealants for wood products. The halogenated phosphate ester can be incorporated into the formulation in various ways as long as either wax emulsion or the polymer latex are already present and the water content of the mixture is less than about 65% on a mass basis at the time that the halogenated phosphate ester is added.

Halogenated Phosphate Ester

The halogenated phosphate ester provides improved crocking resistance compared to compositions without a halogenated phosphate ester. The exemplary results illustrating the dramatic improvement in crocking resistance are presented in the EXAMPLES.

Halogenated phosphate esters suitable for this invention are derivatives of phosphoric acid in which one, two or three of the acidic protons have been substituted with a halogenated alkyl group. A preferred halogenated phosphate ester is tris(2-chloroisopropyl)phosphate, which is manufactured by ICL-IP (Beer Sheva, Israel) and is sold under the trade name Fyrol™ PCF. Other halogenated phosphate esters suitable for this invention include tris(1,3-dichloroisopropyl)phosphate, which is also manufactured by ICL-IP (Beer Sheva, Israel) and is sold under the trade name Fyrol™ 38.

In one embodiment, the halogenated phosphate ester is selected from the group consisting of tris(1,3-dichloroisopropyl)phosphate, oligomeric chloroalkyl phosphate esters, chlorinated phosphate ester blends, brominated phosphate esters, tris(2-chloroisopropyl)phosphate, diethyl bis(hydroxyethyl)aminomethyl phosphonate, diethyl-N,N-bis(2-hydroxyethyl), tris(4-bromophenyl)phosphate, dicresyl 4-bromophenyl phosphate, 2,4-dibromophenyl 2ethylcresyl phosphate, 2,4-dibromophenyl methyl phosphate, diethyl 4-bromophenyl phosphate, and other compounds containing both phosphorus and a halogen.

In one embodiment, the halogenated phosphate ester is present from about 0.5% to 12.0% by solids basis. In one embodiment, the halogenated phosphate ester is present from about 1.0% to 10.0% by solids basis. In one embodiment, the halogenated phosphate ester is present from about 2.0% to 8.0% by solids basis.

Wax Emulsion

The wax emulsion imparts hydrophobicity to the coating in order to retard water absorption into the wood product.

In one embodiment, the wax emulsion comprises water, a surfactant, and a wax. An example of a petroleum-based aqueous wax emulsion is known as EW58ES, which has a solids content of 58%, an alkaline pH and is manufactured by Momentive Performance Specialty Chemicals (Dibol, Tex.).

In one embodiment, the wax is selected from the group consisting of petroleum-based wax, plant-based wax, animal-based wax, and mixtures thereof. Different types of wax can be used in the wax emulsion, including waxes derived from petroleum, such as slack wax; animals, such as hydrogenated tallow; or plant-based waxes, which commonly involve plant oils that are subsequently hydrogenated.

In one embodiment the wax is a petroleum-based wax. Representative petroleum-based waxes, such as slack wax, are manufactured by the ExxonMobil Corporation (Irving, Tex.).

Suitable animal or plant-based waxes are commonly prepared by sequentially bleaching, deodorizing and hydrogenating (partially or fully) fatty esters or acids obtained from the plant or animal. Examples of plant and animal waxes include SCP135 (tallow derived) and SCP135V (palm-oil derived), which are both manufactured by South Chicago Packers (Chicago, Ill.). Mixtures of waxes can also be used.

The solids content (non-volatile content when 2 g are placed in an aluminum pan and heated in an oven at 100° C. for 2 hours) in the wax emulsion is typically about 40-60%.

Typically, about 80-99% of the non-volatile material in the wax emulsion is wax, while the balance of the non-volatile material is surfactant. Exemplary surfactants include salts based on long-chain fatty acids, such as stearic acid, or mixtures of fatty acids and one or more alkaline compounds. Lignosulfonate salts are also commonly used as surfactants in certain wax emulsions. In one embodiment, the wax emulsion comprises an anionic surfactant. In one embodiment, the surfactant is selected from the group consisting of anionic surfactants and nonionic surfactants.

In one embodiment, the wax emulsion is present from about 40% to 90% by solids basis. In one embodiment, the wax emulsion is present from about 50% to 85% by solids basis. In one embodiment, the wax emulsion is present from about 60% to 80% by solids basis.

Colored Pigment

The colored pigment provides color to the surface (e.g., wood product) onto which it is applied. The color achieves 1) visual differentiation, 2) brand recognition, and 3) a dramatic sensory cue to the customer that the surface of the product has been deliberately modified (and is therefore of higher quality).

In one embodiment, the colored pigment is selected from the group consisting of copper phthalocyanine blue (Pigment Blue 15), halogenated copper phthalocyanine green (Pigment Green 7), barium lithol red (Pigment Red 49:1), toluidine red (Pigment Red 3), calcium lithol rubine (Pigment Red 57:1), quinacridone quinine (Pigment Orange 49), perylene reds (including Pigment Red 224), benzamidazolone pigments (including Pigment Red 242), thioindigo reds (including violet shade Pigment Red 88), carbazole violet (including Pigment Violet 23), monoarylide yellows (including Hansa Yellow G), diarylide yellows (including Pigment Yellow 12), benzimidazolone yellows (including Pigment Yellow 120), heterocyclic yellows (including Pigment Yellow 138), orthonitraniline orange (Pigment Orange 2), nathol orange (Pigment Orange 38), carbon black, and combinations thereof.

Additional colored pigments suitable for the compositions include inorganic pigments such as iron oxide or lead chromate. Pigments can also include natural pigments such as carotenoids or flavanoids. It is usually most convenient to incorporate the pigments into the sealant formulation in the form of an aqueous pigment dispersion. These are commercially available from companies such as the Sun Chemical Corporation (Parsippany, N.J.) and are comprised of pigment particles, a wetting agent, water and other additives, such as surfactants.

In one embodiment, the colored pigment is present from about 0.1% to 20% by solids basis. In one embodiment, the colored pigment is present from about 0.5% to 10% by solids basis. In one embodiment, the colored pigment is present from about 1% to 8% by solids basis.

Preparation of the Compositions

The compositions can be prepared by sequentially charging a mixing vessel with a wax emulsion, a polymer latex, a halogenated phosphate ester, and one or more colored pigments. Subsequent to each component addition the existing mixture is agitated under low-shear conditions in order to achieve a homogenous mixture without placing undue stress on the emulsion. Agitating water-based emulsions under prolonged high-shear conditions has the potential to coagulate (i.e., break) the emulsion. The order of addition of the primary, essential components can be adjusted as long as the water content of the mixture is less than about 65% by mass at the time that the halogenated phosphate ester is added and such that the halogenated phosphate ester is added after either the wax emulsion or the polymer latex have been added. Alternatively, the polymer latex and the halogenated phosphate ester can be pre-mixed in a different vessel and the mixture can then be added to the rest of the formula, even if the water content of the partially prepared mixture exceeds about 65%. Additional components, such as water, bases, viscosity-adjusting agents, preservatives, opacifying agents, and other ancillary additives can be incorporated into the formula.

Application of the Compositions as a Coating

Coatings of the composition according to embodiments of the disclosure may be applied to a number of different products. As a non-limiting example, such coatings may be applied to wood products. Generally, coatings according to embodiments of the disclosure are applied to one or more surfaces of a wood product. In certain embodiments, coatings may be applied to a portion of one or more surfaces of the wood product. In certain embodiments, entire surfaces, or the entire surface, of wood product may be covered. In certain embodiments, the coating covers approximately 50% to approximately 100% of the product's surface area.

In one aspect, a wood product having water resistance and crocking resistance is provided. In one embodiment, a coating of the provided compositions is disposed on a surface of the wood product.

In one embodiment, the wood product is selected from the group consisting of: I-joists, trusses, glulam, solid sawn lumber, parallel strand lumber (PSL), oriented strand board (OSB), oriented strand lumber (OSL), laminated veneer lumber (LVL), laminated strand lumber (LSL), particleboard, cross-laminated timber, hardboard, and medium density fiberboard (MDF).

FIGS. 1-4 depict wood products having coatings of the compositions according to embodiments of the disclosure. FIGS. 1 and 2 show an I-joist 10 having a top flange 12, a bottom flange 14, and a webstock member 16 connecting the top flange 12 to the bottom flange 14. In FIG. 1, the webstock member 16 is shown completely coated in a coating 18 of a composition according to embodiments of the disclosure. In certain embodiments, only a portion (e.g., 50% to 90%) of the webstock member 16 is coated. Although not explicitly shown in FIG. 1, some portion of overspray may be applied to the top flange 12 and/or the bottom flange 14.

Referring to FIG. 2, the I-joist 10 is shown in a state similar to that of FIG. 1, but also with the top flange 12 and the bottom flange 14 coated with the composition according to embodiments of the disclosure. In certain embodiments, the coating covers 10% to 50% of the I-joist surface area. In other embodiments, the coating covers 51% to 100% of the I-joist surface area. A person of ordinary skill in the art will appreciate that numerous different application configurations for I-joists not shown explicitly in FIGS. 1 and 2 are within the scope of this disclosure.

Figure 4:
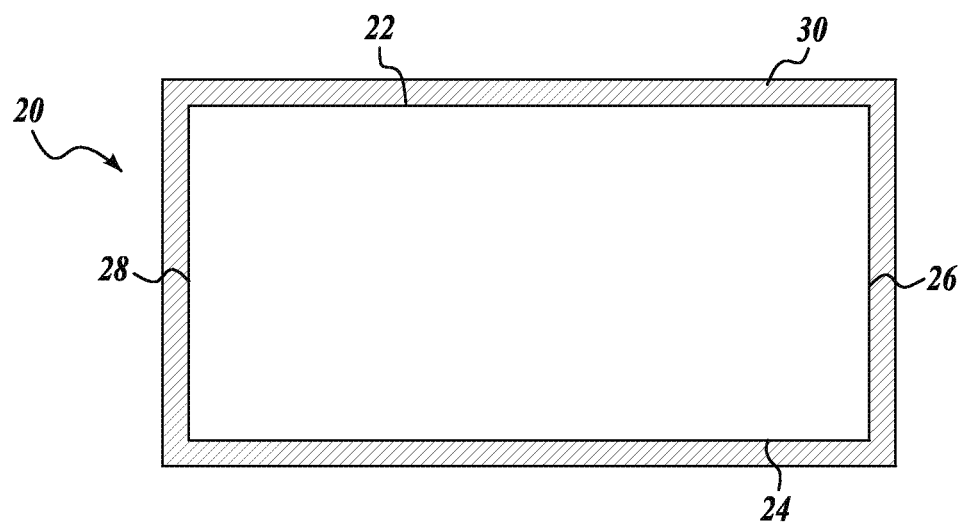

Referring to FIGS. 3 and 4, a wood product 20 is shown having a first surface 22, a second surface 24, a third surface 26, and a fourth surface 28. The wood product 20 may be any type of wood product. A person of ordinary skill in the art will appreciate that wood products according to this disclosure may have shapes other than those explicitly shown in the FIGURES.

Referring to FIG. 3, only the first surface 22 and the second surface 24 of the wood product 20 is coated with a coating 30 of a composition according to embodiments of the disclosure. The entire surfaces 22 and 24 may be coated or a portion may be coated.

In certain situations, it may be cost effective to coat only a portion of a surface of the wood product 20. For example, it is also possible that application of the coating 30 to a wood product 20 used as a building material could interfere with the ability of the wood product 20 to be connected or fastened, such as by nailing or screwing, to other building materials. In this situation, complete coverage of all of the exposed surface area on the wood product 20 may be undesirable.

Referring to FIG. 4, all four surfaces (the first surface 22, the second surface 24, the third surface 26, and the fourth surface 28) are coated with the coating 30. In certain situations, it may be desirable to cover each surface entirely or to cover only a portion of each surface. In certain embodiments, the coating 20 covers 10% to 50% of the wood product 20 surface area. In other embodiments, the coating 20 covers 51% to 100% of the wood product 20 surface area. A person of ordinary skill in the art will appreciate that numerous different application configurations for wood product 20 not shown explicitly in FIGS. 3 and 4 are within the scope of this disclosure.

Figure 5:
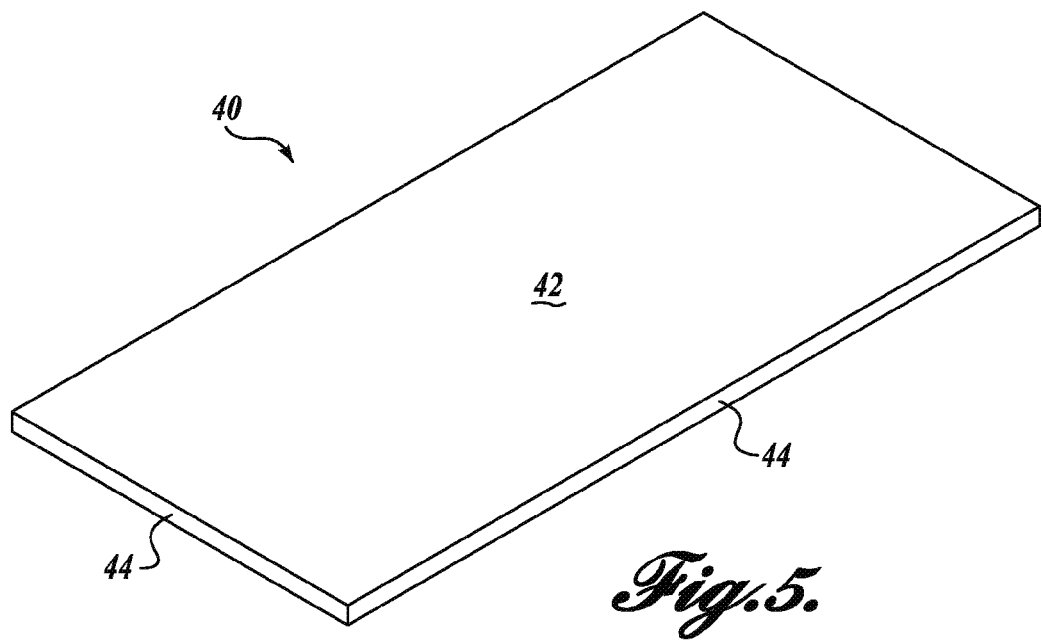
FIG. 5 is a perspective view of a wood product (e.g., oriented strand board) panel.
Figure 6:
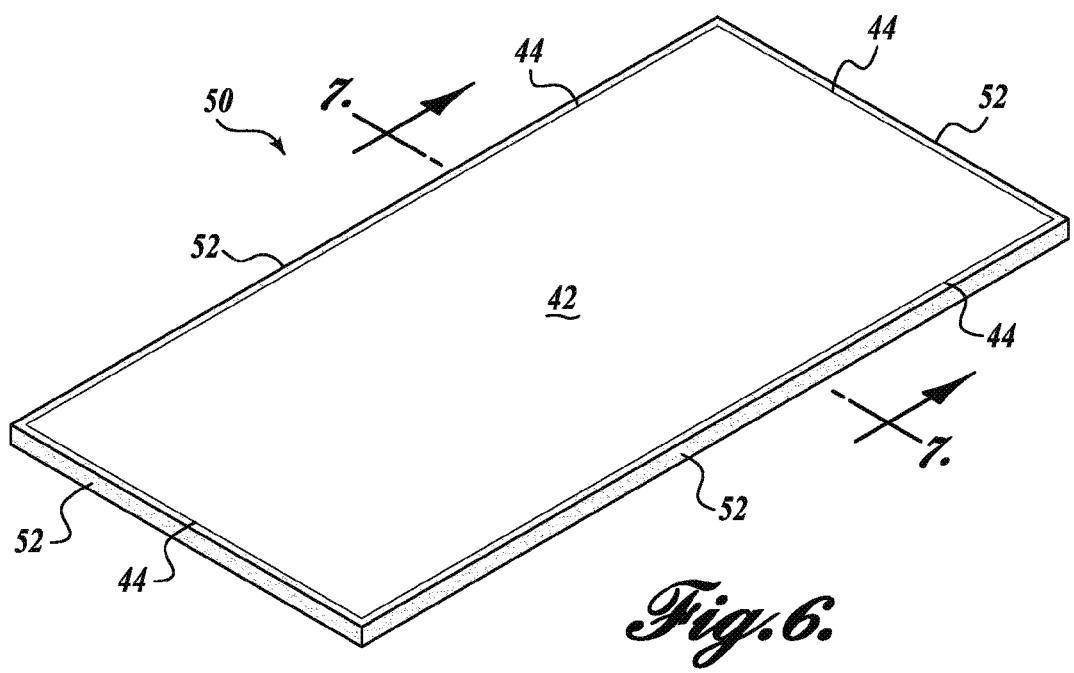
FIG. 6 is a perspective view of a wood product panel with its edges coated with a composition according to the embodiments of the disclosure.
Figure 7:
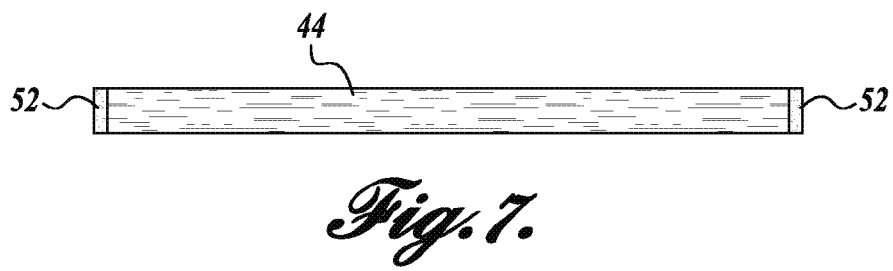
FIG. 7 is a cross-sectional view of the coated wood product of FIG. 7.

The provided coatings are of particular interest as edge sealants for wood products, such as OSB panels, as may be better understood with reference to FIGS. 5-7. Such panels are typically edge treated in order to prevent moisture absorption through the edge. The typical treatment is a colored sealant, which will prevent moisture uptake but exhibits crocking. The provided embodiments include a crocking-resistant sealant that can be used as an edge sealant for such wood products. A representative uncoated panel 40 is illustrated in FIG. 5 having a major (e.g., top) face 42 and edges 44. FIG. 6 is a perspective view of a wood product coated panel 50 in accordance with the disclosed embodiments. The coated panel 50 includes a panel 40 (such as that illustrated in FIG. 5) with its edges 44 coated with a composition 52 according to the embodiments of the disclosure. FIG. 7 is a cross-sectional view of the coated panel 50 of FIG. 7.

It will also be appreciated that coatings made according to embodiments of the disclosure may be applied to different types of wood products other than those explicitly illustrated. For example, coatings may be applied to trusses or joists having any known configuration. In certain embodiments, wood products coated according to the disclosure include single sawn pieces of wood products, or products having specific shapes. As a non-limiting example, coatings according to the disclosure may be applied to a variety of wood products (e.g., trusses) having a top flange, bottom flange, and one or more web stock members.

The application level of the coating may generally be in the range of 20 g/m² to 750 g/m².

The preferred coating application level may depend on the product to which the coating is applied, the intended use, and performance requirements. In certain situations, minimal protection of the wood product might be needed and a relatively low spread rate may be suitable. In other situations (e.g., an exposed floor panel), a higher application rate may be appropriate.

Coatings according to embodiments of the disclosure may be applied with any equipment known to those of skill in the art, such as spray systems, extruders, curtain coaters, and roll coaters, and other application equipment.

In certain embodiments, the coating is applied manually with a hand-held knife or brush.

Although this disclosure explicitly describes applications of coatings to wood products, a person of ordinary skill in the art will appreciate that coatings made according to embodiments of the disclosure may be applied to different types of materials. As a non-limiting example, coatings of the provided compositions may be applied to other types of construction materials, including but not limited to wood/plastic composites, gypsum, steel (including light-gauge steel framing and steel beams and columns), aluminum (ducting), and concrete. Furthermore, coatings according to embodiments of the disclosure may be applied to surfaces other than constructions materials in any situation where the properties of the composition may be beneficial.

An exemplary method for determining if a wood product has been coated with a composition of the disclosed embodiments is as follows. Wood products that have been treated with colored, sealant compositions that were prepared by use of a halogenated phosphate ester can be "detected" by 1) isolating a sample of the sealant-treated wood by use of a cutting or scrapping action such that 5% or greater of the material isolated is coating material as opposed to wood; 2)

subjecting a portion of the isolated material to digestion in accordance with EPA Method 30-50 and sequential assay for phosphorous by use of EPA Method 200.8 (ICP-Mass Spectroscopy) and subsequent calculation to determine the concentration of phosphorous in the isolated material (mass basis); 3) processing of a second portion of the isolated material to a Dohrmann TX Analyzer in order to determine the concentration of halide in the isolated material (mass basis); and 4) inspection of the assay results to determine if the levels of phosphorous and halide are above expected background levels in wood products (about 250 ppm for chlorine and about 50 ppm for phosphorous). For instance if a sample of wood and coating mixture had a coating level of 5% on a mass basis, and the coating was that described in the exemplary example, then the measured chlorine level of the isolated sample would be about 1,200 ppm and the measured level of phosphorous would be about 350 ppm. Both the phosphorous and the chlorine levels would be significantly greater than background levels for these elements in a conventional wood product and we would strongly suspect the use of a halogenated phosphate ester. Further testing to obtain more definitive proof of the use of a halogenated phosphate ester could be accomplished by extraction of the isolated material with methylene chloride and processing of the extract in a gas chromatography machine equipped with a mass spectrophotometer and the associated use of halogenated phosphate ester standards.

Words in the above disclosure using the singular or plural number may also include the plural or singular number, respectively. For example, the term "wood product" could also apply to "wood products." Additionally, the words "herein," "above," "below," and words of similar import, when used in this application, shall refer to this application as a whole and not to any particular portions of this application. When the word "or" is used in reference to a list of two or more items, that word covers all of the following interpretations of the word: any of the items in the list, all of the items in the list, and any combination of the items in the list.

From the foregoing, it will be appreciated that the specific embodiments of the disclosure have been described herein for purposes of illustration, but that various modifications may be made without deviating from the disclosure.

Aspects of the disclosure described in the context of particular embodiments may be combined or eliminated in other embodiments. For example, aspects of the disclosure related to I-joists may be combined with aspects of the disclosure related to other wood products. Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

EXAMPLES

Exemplary Coating

An exemplary sealant composition was prepared by sequentially charging a 1-Liter plastic beaker with the following components in the order listed and stirring the mixture subsequent to each addition under low-shear conditions (slow mixing speed) with a Cowles blade (2" diameter): 28% Ammonium Hydroxide (aq.) (sourced from Van Waters & Rogers); 50% ASE60 Thickener (sourced from Dow Chemical Company); 55% Titanium Dioxide Dispersion (sourced from Tronox Incorporated); Phthalo Blue Pigment Dispersion (sourced from Flint Group Pigments); Pigment Yellow 14 Dispersion (sourced from Flint Group Pigments); and 33.4% TT615 Thickener (aq.) (sourced from Dow Chemical Company).

Exemplary Sealant Coating Composition

| COMPONENT | MASS (g) (WET BASIS) | SOLIDS PERCENTAGE (%) OF COMPONENT | MASS (g) (SOLIDS BASIS) | PERCENTAGE (%) OF TOTAL FORMULA ON A SOLIDS BASIS | MIX TIME (MIN) |
|---|---|---|---|---|---|
| EW58ES Wax Emulsion | 194.8 | 58 | 113.0 | 72.4 | |
| 28% Ammonium Hydroxide (aq.) | 2.5 | 28 | 0.7 | 0.5 | 10 |
| RayTech 51 Polymer Latex | 51.0 | 45 | 23.0 | 14.7 | 10 |
| tris (2-chloroisopropyl) phosphate | 10.0 | 100 | 10.0 | 6.4 | 20 |
| Water | 121.6 | 0 | 0 | 0 | 10 |
| 50% ASE60 Thickener | 6.5 | 50 | 3.3 | 2.1 | 10 |
| 55% Titanium Dioxide Dispersion | 4.0 | 55 | 2.2 | 1.4 | 5 |
| Phthalo Blue Pigment Dispersion | 1.7 | 40 | 0.7 | 0.5 | 5 |
| Pigment Yellow 14 Dispersion | 7.3 | 40 | 2.9 | 1.9 | 5 |
| 33.4% TT615 Thickener (aq.) | 0.6 | 33.4 | 0.2 | 0.1 | 10 |

The resulting liquid formulation had a green color, a pH value of 10.4, a specific gravity of 0.969, a calculated percent solids content of 40.0%, and a viscosity of 272 cP (as determined by use of a Brookfield Viscometer at 20° C. with a #3 spindle and a rotation rate of 50 rpm).

The liquid formulation of the composition was evaluated for crocking potential in the following manner: An aluminum coupon (4"×12"×1/16") was spray-coated on one major surface with the composition sealant (12 g/ft² wet). The applied sealant on the metal coupon was dried for two days at 50% R.H. and 20° C. The coated coupon was mounted on a stage that was adjacent to an Instron machine. A section of medium density fiberboard (MDF) (4"4"×0.75") was placed onto one end of the coated coupon such that a major face of the MDF (4"×4") was in direct contact with the dried sealant coating. A weight (5 lb.) was placed on top of the MDF section and a cord was attached to one end of the MDF. The cord was attached to the Instron displacement ram and the machine was used to pull the MDF section across the coated aluminum coupon a distance of 6.0" at a rate of 10 inch/minute. The MDF section was then isolated from the test apparatus and the major surface of the MDF that had been rubbed across the sealant was subjected to image analysis in order to objectively determine the percentage of surface area of the MDF that was green in color. This entire test was conducted three times and the test results are shown in the following table:

Exemplary Coating Test Results

| REPLICATE TEST | SURFACE AREA (%) OF MDF WITH GREEN COLOR |
|---|---|
| 1 | 1.0 |
| 2 | 2.2 |
| 3 | 1.9 |
| Average | 1.7 |

Comparative Coating

A comparative sealant composition was prepared by sequentially charging a 1-Liter plastic beaker with the following components in the order listed and stirring the mixture subsequent to each addition under low-shear conditions (slow mixing speed) with a Cowles blade (2" diameter):

Comparative Coating Composition

| COMPONENT | MASS (g) (WET BASIS) | SOLIDS PERCENTAGE (%) OF COMPONENT | MASS (g) (SOLIDS BASIS) | PERCENTAGE (%) OF TOTAL FORMULA ON A SOLIDS BASIS | MIX TIME (MIN) |
|---|---|---|---|---|---|
| EW58ES Wax Emulsion | 212.0 | 58 | 123.0 | 78.8 | |
| Water | 114.4 | 0 | 0 | 0 | 5 |
| 28% Ammonium Hydroxide (aq.) | 2.5 | 28 | 0.7 | 0.5 | 10 |
| 50% ASE60 Thickener | 6.5 | 50 | 3.3 | 2.1 | 10 |
| RayTech 51 Polymer Latex | 51.0 | 45 | 23.0 | 14.7 | 10 |
| 55% Titanium Dioxide Dispersion | 4.0 | 55 | 2.2 | 1.4 | 5 |
| Phthalo Blue Pigment Dispersion | 1.7 | 40 | 0.7 | 0.5 | 5 |
| Pigment Yellow 14 Dispersion | 7.3 | 40 | 2.9 | 1.9 | 5 |
| 33.4% TT615 Thickener (aq.) | 0.6 | 33.4 | 0.2 | 0.1 | 10 |

The resulting liquid formulation had a green color, a pH value of 10.6, a specific gravity of 0.970, a calculated percent solids content of 40.0%, and a viscosity of 380 cP (as determined by use of a Brookfield Viscometer at 20° C. with a #3 spindle and a rotation rate of 50 rpm).

The liquid formulation was evaluated for crocking potential in the following manner: An aluminum coupon (4"×12"× 1/16") was spray-coated on one major surface with sealant (12 g/ft² wet). The applied sealant on the metal coupon was dried for two days at 50% R.H. and 20° C. The coated coupon was mounted on a stage that was adjacent to an Instron machine. A section of medium density fiberboard (MDF) (4"×4"×0.75") was placed onto one end of the coated coupon such that a major face of the MDF (4"×4") was in direct contact with the dried sealant coating. A weight (5 lb.) was placed on top of the MDF section and a cord was attached to one end of the MDF. The cord was attached to the Instron displacement ram and the machine was used to pull the MDF section across the coated aluminum coupon a distance of 6.0" at a rate of 10 inch/minute. The MDF section was then isolated from the test apparatus and the major surface of the MDF that had been rubbed across the sealant was subjected to image analysis in order to objectively determine the percentage of surface area of the MDF that was green in color. This entire test was conducted three times and the test results are shown in the following table:

Comparative Coating Test Results

| REPLICATE TEST | SURFACE AREA (%) OF MDF WITH GREEN COLOR |
|---|---|
| 1 | 4.5 |
| 2 | 9.4 |
| 3 | 10.6 |
| Average | 8.1 |

CONCLUSIONS

The crocking test results provide a clear indication that the exemplary coating was more resistant to crocking (color transfer) than was the comparative coating. Because the only compositional difference between the two coating types was the presence of the halogenated phosphate ester in the exemplary coating, we attribute the performance improvement to the halogenated phosphate ester component.

While illustrative embodiments have been illustrated and described, it will be appreciated that various changes can be made therein without departing from the spirit and scope of the invention.

The invention claimed is:

1. A colored, water-repellant, sealant composition having crocking resistance, comprising:
   a polymer latex present from about 2% to 30% by solids basis;
   a halogenated phosphate ester present from about 0.5% to 12% by solids basis;
   a wax emulsion present from about 40% to 90% by solids basis; and
   a colored pigment present from about 0.1% to 20% by solids basis.

2. The composition of claim 1, wherein the polymer latex is an acrylic latex or a styrene-butadiene latex.

3. The composition of claim 1, wherein the polymer latex is present from about 4% to 25% by solids basis.

4. The composition of claim 1, wherein the polymer latex is present from about 8% to 20% by solids basis.

5. The composition of claim 1, wherein the halogenated phosphate ester is selected from the group consisting of tris (1,3-dichloroisopropyl)phosphate, oligomeric chloroalkyl phosphate esters, chlorinated phosphate ester blends, brominated phosphate esters, tris(2-chloroisopropyl)phosphate, tris(4-bromophenyl)phosphate, dicresyl 4-bromophenyl phosphate, 2,4-dibromophenyl 2ethylcresyl phosphate, 2,4-dibromophenyl methyl phosphate, diethyl 4-bromophenyl phosphate, and other compounds containing both phosphorus and a halogen.

6. The composition of claim 1, wherein the halogenated phosphate ester is present from about 1.0% to 10.0% by solids basis.

7. The composition of claim 1, wherein the halogenated phosphate ester is present from about 2.0% to 8.0% by solids basis.

8. The composition of claim 1, wherein the wax emulsion comprises water, a surfactant, and a wax.

9. The composition of claim 8, wherein the wax is selected from the group consisting of petroleum-based, plant-based, animal-based, and mixtures thereof.

10. The composition of claim 1, wherein the wax emulsion is present from about 50% to 85% by solids basis.

11. The composition of claim 1, wherein the wax emulsion is present from about 60% to 80% by solids basis.

12. The composition of claim 1, wherein the wax emulsion comprises an anionic surfactant.

13. The composition of claim 8, wherein the surfactant is selected from the group consisting of anionic surfactants and nonionic surfactants.

14. The composition of claim 1, wherein the colored pigment is selected from the group consisting of copper phthalocyanine blue (Pigment Blue 15), halogenated copper phthalocyanine green (Pigment Green 7), barium lithol red (Pigment Red 49:1), toluidine red (Pigment Red 3), calcium lithol rubine (Pigment Red 57:1), quinacridone quinine (Pigment Orange 49), perylene reds (including Pigment Red 224), benzamidazolone pigments (including Pigment Red 242), thioindigo reds (including violet shade Pigment Red 88), carbazole violet (including Pigment Violet 23), monoarylide yellows (including Hansa Yellow G), diarylide yellows (including Pigment Yellow 12), benzimidazolone yellows (including Pigment Yellow 120), heterocyclic yellows (including Pigment Yellow 138), orthonitraniline orange (Pigment Orange 2), nathol orange (Pigment Orange 38), carbon black, and combinations thereof.

15. The composition of claim 1, wherein the colored pigment is present from about 0.5% to 10% by solids basis.

16. The composition of claim 1, wherein the colored pigment is present from about 1% to 8% by solids basis.

17. A wood product having water resistance and crocking resistance, comprising:
    a wood product having at least one surface; and
    a composition disposed on at least a portion of the at least one surface, applied to the surface at an application level from about 20 g/m2 to 750 g/m2;
    wherein the composition comprises:
       a polymer latex present from about 2% to 30% by solids basis;
       a halogenated phosphate ester present from about 0.5% to 12% by solids basis;
       a wax emulsion present from about 40% to 90% by solids basis; and
       a colored pigment present from about 0.1% to 20% by solids basis.

18. The wood product of claim 17, wherein the wood product is selected from the group consisting of I-joists, trusses, glulam, solid sawn lumber, parallel strand lumber (PSL), oriented strand board (OSB), oriented strand lumber (OSL), laminated veneer lumber (LVL), laminated strand lumber (LSL), particleboard, cross-laminated timber, hardboard, and medium density fiberboard (MDF).

19. The wood product of claim 17, wherein the wood product is oriented strand board and the composition is applied only to edges of the wood product, wherein the composition is applied at a level of about 20 to 750 g/m2.

* * * * *